United States Patent
Stephens (10) Patent No.: US 6,834,407 B2
(45) Date of Patent: Dec. 28, 2004

(54) METHOD AND APPARATUS FOR ELECTRONICALLY COMMUTATED MOTOR WASHER AGITATION CONTROLLER

(75) Inventor: Charles Michael Stephens, Pattersonville, NY (US)

(73) Assignee: General Electric Company, Niskayuna, NY (US)

( * ) Notice: Subject to any disclaimer, the term of this patent is extended or adjusted under 35 U.S.C. 154(b) by 209 days.

(21) Appl. No.: 10/320,998

(22) Filed: Dec. 17, 2002

(65) Prior Publication Data

US 2004/0112096 A1 Jun. 17, 2004

(51) Int. Cl.[7] .................................................. D06F 33/02
(52) U.S. Cl. .............................................. 8/158; 68/12.16
(58) Field of Search .................... 8/158, 159; 68/12.02, 68/12.16, 13 R; 318/779, 806

(56) References Cited

U.S. PATENT DOCUMENTS

| | | | | |
|---|---|---|---|---|
| 4,724,373 A | * | 2/1988 | Lipo | 318/805 |
| 5,115,174 A | * | 5/1992 | Masuda et al. | 318/254 |
| 5,183,069 A | * | 2/1993 | Berg et al. | 137/15.18 |
| 5,576,620 A | * | 11/1996 | Cheong | 324/174 |
| 5,994,869 A | * | 11/1999 | Becerra | 318/729 |
| 6,191,545 B1 | * | 2/2001 | Kawabata et al. | 318/439 |
| 6,208,112 B1 | * | 3/2001 | Jensen et al. | 318/805 |
| 6,236,183 B1 | * | 5/2001 | Schroeder | 318/721 |

FOREIGN PATENT DOCUMENTS

| | | | |
|---|---|---|---|
| DE | 296 23 242 | * | 4/1998 |
| JP | 1-308158 | * | 12/1989 |
| JP | 8-149875 | * | 6/1996 |
| JP | 2001-259281 | * | 9/2001 |

* cited by examiner

Primary Examiner—Frankie L. Stinson
(74) Attorney, Agent, or Firm—Scully, Scott, Murphy & Presser (57) ABSTRACT

A motor control for a clothes washing machine having an electronically commutated motor (ECM). A position-feedback is employed by the ECM to control sinusoidal motion of the washing machine agitator. An agitator position feedback signal is constructed from the motor commutation signals, and is compared to a digitally created sinewave position command signal. The error between the two signals is fed to control system Proportional-integral (PI) block, and the output of the PI block sets the level of motor current command. The control system is implemented in a digital signal processor, which also controls the motor's electronic inverter.

28 Claims, 8 Drawing Sheets

METHOD AND APPARATUS FOR ELECTRONICALLY COMMUTATED MOTOR WASHER AGITATION CONTROLLER

BACKGROUND OF THE INVENTION

The present invention relates generally to washing machines, and more particularly pertains to the control of a washing machine which employs a variable speed electronically commutated motor (ECM) coupled to an agitator and a basket.

Conventional washing machines typically include a basket that holds articles such as clothes to be washed, an agitator disposed within the basket which agitates the clothes in the basket during a wash cycle, and a motor which drives the agitator and the basket. The motor is typically an AC induction motor, which can reverse its rotation direction to achieve different modes of operation during a wash cycle. The motor, for example, may rotate in a first direction during an agitation mode and a second direction, opposite the first direction, in a spin mode.

In a conventional washing machine, a transmission is typically provided, and it comprises gears, a concentric lobe and follower, and rack and pinion components to convert a rotational motion of the AC induction motor into an oscillatory motion of the agitator during an agitation mode. Additional mechanisms are provided to bypass the transmission to obtain high speed rotation during the spin mode. In addition, a brake is typically associated with the transmission to hold the transmission (and hence the basket) immobile during an agitation mode, and a clutch or actuator is provided to engage or disengage the brake. Further, an additional slip clutch is typically installed between the motor and the agitator, since the AC induction motor cannot immediately generate the required full torque.

Although washing machines powered by AC induction motors generally operate in a satisfactory manner, they are generally both complicated and inflexible. For example, the transmission is a relatively complex unit that includes many moving parts and contributes substantially to the unreliability and cost of the washing machine. It is also configured to provide only a limited number of options with regard to the motions of the basket and the agitator.

To overcome some of the limitations of conventional AC induction motor powered washing machines, variable speed reversible electric motors have been implemented to simplify the construction of washing machines and to allow more flexibility in controlling the motions of the basket and the agitator.

The rotational speed and direction of a variable speed reversible electric motor, sometimes referred to as an electronically commutated motor (ECM), can be controlled with electronic commutation equipment which enables the ECM to move in a clockwise or counterclockwise motion causing the agitator to oscillate clockwise or counterclockwise in an agitation mode. Although washing machines employing an ECM have certain advantages over prior art AC induction motor powered washing machines, problems remain with simplifying the precise control of the ECM during agitation, due to variations in the load size of clothing and other articles to be washed.

SUMMARY OF INVENTION

The present invention provides a washing machine with the flexibility of a variable speed reversible electric motor that has a simplified control capable of precisely controlling various agitation cycles under differing load conditions. The washing machine comprises an agitator for agitating articles of clothing and the like to be washed and an agitator drive shaft connected to the agitator for driving the agitator. A variable speed electronically commutated motor (ECM) is provided for driving the agitator drive shaft and a basket drive shaft which drives the basket of the washing machine. The agitator drive shaft may be directly connected to the rotor of the ECM or connected to the rotor of the ECM by a belt between an ECM pulley and an agitator pulley, or through a simple gear reducer.

When driving the agitator drive shaft, an ECM control unit provides current commands to the ECM to produce a variety of agitation cycles. The current commands produced by the ECM control unit are generated by a microprocessor which implements a feedback control system that compares a digitally generated sinewave agitator position command, stored in a read-only-memory (ROM) and selected by the user to implement a specific agitation cycle, with a measured agitator position. Measurement of the agitator position, and the direction of motion of the agitator at any time during an agitator cycle, are provided by processing the signals of three adjacent Hall sensors positioned near the rotor of the ECM. The three Hall sensors provide basic rotor position information used to direct the gating action of power transistors in the controller. The Hall sensors can only indicate six unique localized position sectors that are repeated many times over a rotor motion providing typical washer agitation motion.

Since the ECM rotor can only rotate from one sector to another sector at any given time, the ECM control unit can determine whether the rotor, and thus the agitator, is moving clockwise, counterclockwise or reversing its rotation by processing the sector indications produced by the three Hall sensors. This information is used to construct a facsimile of the agitator position, referred to here as the constructed agitator position. Using a standard feedback control loop which compares the measured agitator position with the sinewave position command, the microprocessor of the ECM control unit outputs an ECM current command to drive the ECM such that the actual motion of the agitator closely approximates the command motion of the agitator based on the user's selection of a particular agitator cycle. Additionally, the actual current flowing to the ECM is monitored to ensure that it remains within predetermined upper and lower current limits relative to the current command.

BRIEF DESCRIPTION OF THE DRAWINGS

Other features and advantages will be more readily understood upon reading the following detailed description, taken in conjunction with drawings, in which.

DETAILED DESCRIPTION OF THE PREFERRED EMBODIMENT

Figure 1:
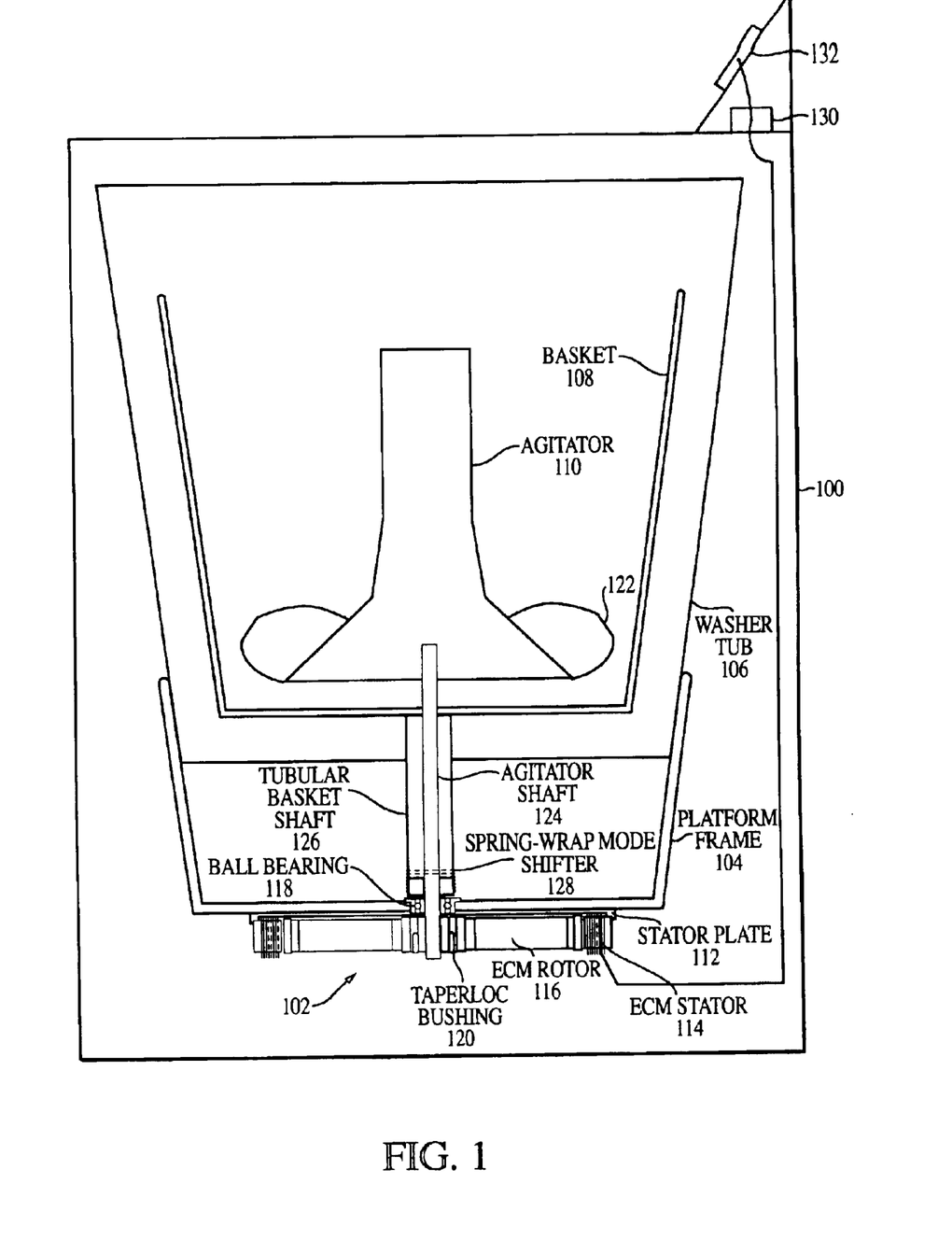
FIG. 1 illustrates a washing machine according to an exemplary embodiment of the present invention.

FIG. 1 shows a drive system for a washing machine 100 with a direct drive by an electronically commutated motor (ECM) 102 according to an exemplary embodiment of the invention. A platform frame 104 is positioned within the cabinet of the washing machine and supports a washer tub 106, a basket 108, an agitator 110, and a stator plate 12 of the ECM 102, which also includes an ECM stator 114, ECM rotor 116, ball bearing 118, and a taperLoc bushing 120.

The basket 108 holds articles such as clothes to be washed and the agitator 110 agitates the clothes in the basket. The agitator is typically molded out of a plastic such polypropylene and typically includes a plurality of agitator vanes 122. The vanes 122 are typically flexible and mechanically agitate the clothes as the agitator is oscillated by an agitator shaft 124. The basket 108 and the agitator 110 are coaxially located within the tub 106 which retains the wash liquid (e.g., detergent, water and water softener) during the wash cycle.

To power the washing machine, a variable speed ECM 102 is provided. The ECM 102 is coupled to the basket 108 by a tubular basket shaft 126 and to the agitator 110 by the agitator shaft 124. The ECM 102 can drive the agitator singularly, or both the agitator and the basket 108 together through a spring-wrap mode shifter 128. The ECM is controlled by an ECM control unit 130, which receives input selection signals from a selection control panel 132.

The ECM 102 is a variable speed motor which is advantageous because its rotational velocity and torque can be easily controlled, as compared, for example, with a traditional single phase AC induction motor. A variable speed ECM can be programmed with an algorithm to measure and control the drive current which is proportional to the produced torque required to drive the agitator 110 under various wash load conditions. The resulting measurement and control signals are transmitted between the ECM 102 and the ECM control unit 130. The ECM (electronically commutated motor) is an example of a brushless DC motor.

Preferably, the ECM 102 is a 3-phase motor, but could be an n phase motor. The ECM stator 114 windings may be wound and connected on an iron core, with the rotor 116 disposed within the stator 114.

The agitator can be driven with different types of cyclic motion, such as a sinusoidal motion, or a substantially constant velocity motion wherein the agitator reverses rotation, accelerates to a constant velocity motion which it maintains for a time duration, decelerates, reverses rotation, and then repeats the cycle.

Figure 2:
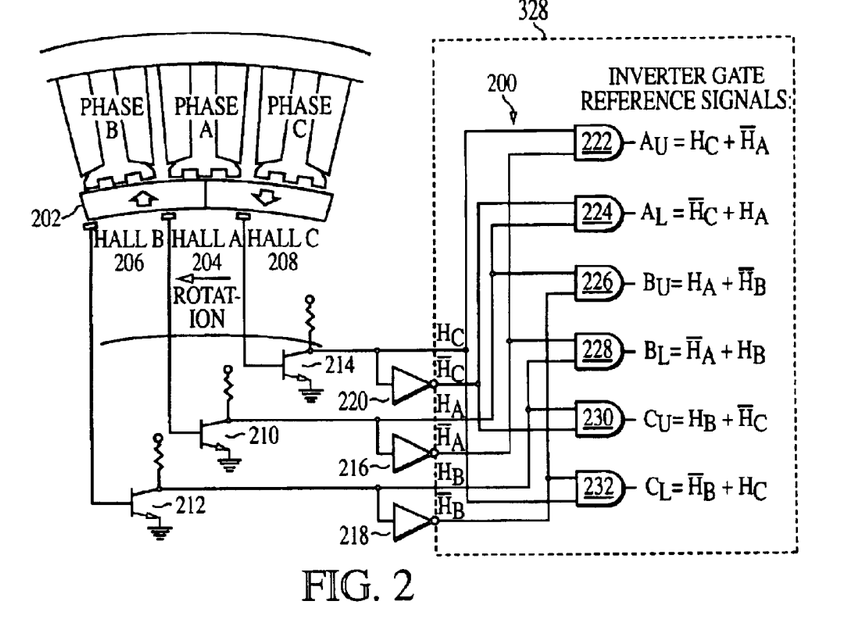
FIG. 2 illustrates a Triple-Hall probe position sensor for a three-phase ECM of the exemplary embodiment of the invention.

FIG. 2 illustrates a triple Hall probe position sensor for a three phase ECM and a position sensor logic network 200. The ECM rotor has positioned therein a plurality of arcurate magnets 202 having alternating North and South fields. Commutation of the windings of the ECM is achieved by the ECM control unit 130 controlled by a suitable means for sensing rotor position. Preferably, three adjacent Hall sensors A 204, B 206, C 208 are utilized to determine the position and direction of rotation of the ECM rotor 116.

Because the torque, speed and rotational direction of the ECM are easily controlled, the washing machine can operate without a transmission, as is normally required in conventional washing machines, to change the direction of motion during the agitation mode. The ECM control unit 130 controls the motion of the agitator 110 and basket 108 in the various modes of the wash cycle. The ECM control unit 130 includes a digital processor such as microprocessor or micro-controller 328, FIG. 3, which is programmed to control the current and voltage inputs to the stator coils over time. For example, the ECM control unit 130 may be programmed to control the input current to the stator windings to effect a motor reversal and thus an oscillatory motion, which oscillates the agitator 110 in an agitation mode. The ECM control unit 130 may also be programmed to effect regenerative braking, in which the voltages and currents applied to the stator coils are controlled to apply a torque to the rotor 116 in a direction opposite the rotational velocity of the rotor. This will slow or stop the rotor.

The relative position of the ECM rotor 116, on a sector basis, is determined by processing signals provided by the three Hall sensors A, B, C in the position sensor logic network 200. As the ECM rotor 116 rotates, a Hall voltage is generated within each of the Hall sensors A, B, C by the effect of the external magnetic field of each arcurate magnet 202 acting perpendicularly to the direction of the current flow within the semiconductor substrate of the Hall sensor. Each Hall sensor includes integrated circuitry for signal processing, with the sensor output provided in the form of an open-collector transistor 210, 212 214, also included within the Hall sensor. When the collector of the open-collector transistor is connected to a DC power source and a pull-up resistor, external to the Hall sensor, a usable logic signal is provided to the sensor logic network 200. The logic levels are zero volts (0), to indicate the Hall sensor is exposed to a magnetic South, and the value of the DC power source voltage (1), to indicate the Hall sensor is exposed to a magnetic North.

With reference to a single Hall sensor A 204, when it is exposed to a magnetic South, a signal produced by the Hall sensor A is an input to the base of a position transistor 210 which produces a zero voltage on the collector output of transistor 210. This indicates a logic zero. Likewise, when Hall sensor A204 is exposed to a magnetic North, no signal is sent to the base of transistor 210, and the collector output of 210 goes to the value of DC source voltage by virtue of the pull-up resistor. This indicates a logic one. The logic output of Hall output transistor 210 is connected to inverter 216, A-phase upper bus AND gate 222 and A-phase lower bus AND gate 224.

The position transistor 210 amplifies the input signal to provide an amplified signal HA to the digital circuitry of the position sensor logic network 200. With respect to Hall sensor A, the digital circuitry of the position sensor logic network consists of a position signal inverter 216, an A-phase upper bus AND gate 222 and an A-phase lower bus AND gate 224. The Hall sensor B includes a similar amplifier 212, inverter 218, B-phase upper bus AND gate 226 and B-phase lower bus AND gate 228, and the Hall sensor C includes a similar amplifier 214, inverter 220, C-phase upper bus AND gate 230 and C-phase lower bus AND gate 232.

The output from position transistor 210 is a logic level one (1) or zero (0) signal HA which is inverted by the position signal inverter 216 to produce a logic level zero (0) or one (1) signal $\overline{H}_A$. A-phase upper bus AND gate 222 ANDs its two inputs to produce an A upper signal $A_U = H_C + \overline{H}_A$, while A-phase lower bus AND gate 224 outputs A-phase lower bus inverter gate reference signal $A_L = \overline{H}_C + H_A$. Similarly, B-phase upper bus AND gate 226 and B-phase lower bus AND gate 228 produce upper and lower bus inverter gate reference signals $B_U$ and $B_L$, respectively, for the B-phase, and the upper and lower bus inverter gate reference signals $C_U$ and $C_L$ for the C-phase are produced by C-phase upper bus AND gate 230 and C-phase lower bus AND gate 232, respectively. The inverter gate reference signals represent a repetitively localized position of the ECM rotor. The logic network 200 is more typically implemented in the microprocessor software, utilizing only signals from the Hall sensor output transistors 210, 212, 214. As explained below, the microprocessor 328, FIG. 3, processes the inverter gate reference signals $A_U, A_L, B_U, B_L, C_U, C_L$ along with a motor current command 402, FIG. 4, to produce the actual applied gating commands.

Figure 3:
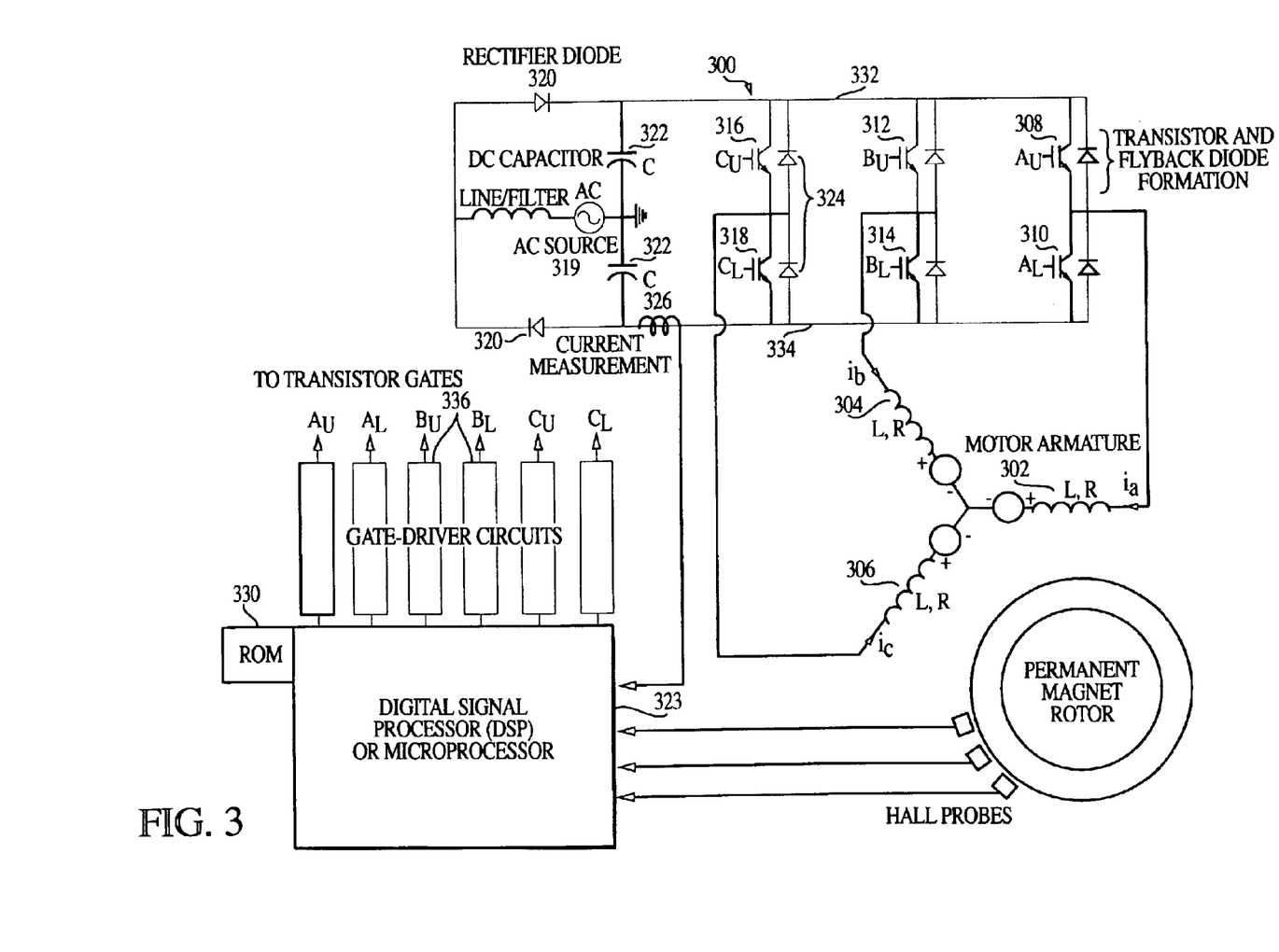
FIG. 3 is a circuit diagram of the ECM inverter power electronic circuit and the basic components of the ECM agitator motion control system of the exemplary embodiment of the invention.

The triple Hall probe position sensor and position sensor logic network of FIG. 2 provide sector position information for the ECM controller, at a resolution of six sectors per electrical cycle. The three logic-output Hall-effect devices A, B, C are positioned adjacent to the rotor as indicated, and their outputs are processed by the logic network 200. The six outputs from the logic network provide gating command references for six transistors of an ECM inverter power electronic circuit 300 (FIG. 3). They are referred to as only references since the actual gating commands which are generated by the microprocessor 328 also considers current regulation commands and torque direction commands.

FIG. 2 illustrates an arrangement of logic gates to process the signals from the Hall probes, which illustrate the conceptual principles involved, but this logic processing is performed in software within the controller 328, as indicated by the block 328 in FIG. 2.

The washing machine control panel 132 allows the user to select a particular washing machine cycle from a variety of available cycles. For example, washing machine cycles are available for light or heavy loads, cotton or permanent press clothing, and gentle or normal wash cycles. For a given washing machine cycle, one or more agitator cycles may be available.

For a given agitator cycle, the alternating rotation and/or the spin of the agitator 10 may be varied. For example, when the user selects a gentle washing machine cycle, the corresponding agitator cycle may include a slow alternating rotation of the agitator along with a moderate spin of the agitator and the basket 108.

The alternating rotation of the agitator 110, and/or the spin of the agitator and basket 108, for a particular agitator cycle is represented by a data file which stores the rotational position of the agitator as a function of time. The agitator cycle data file may be stored as a look-up table in a read only memory (ROM) 330 accessed by the microprocessor 328 located within the ECM control unit 130. Alternatively the agitator command cycle could be computed from specification of the arc span and stroke-rate and then be stored in RAM. When the user selects a particular agitator cycle through the selection of a corresponding washing machine cycle, the microprocessor 328 initiates the process for driving the ECM to generate the desired agitator cycle.

Figure 6:
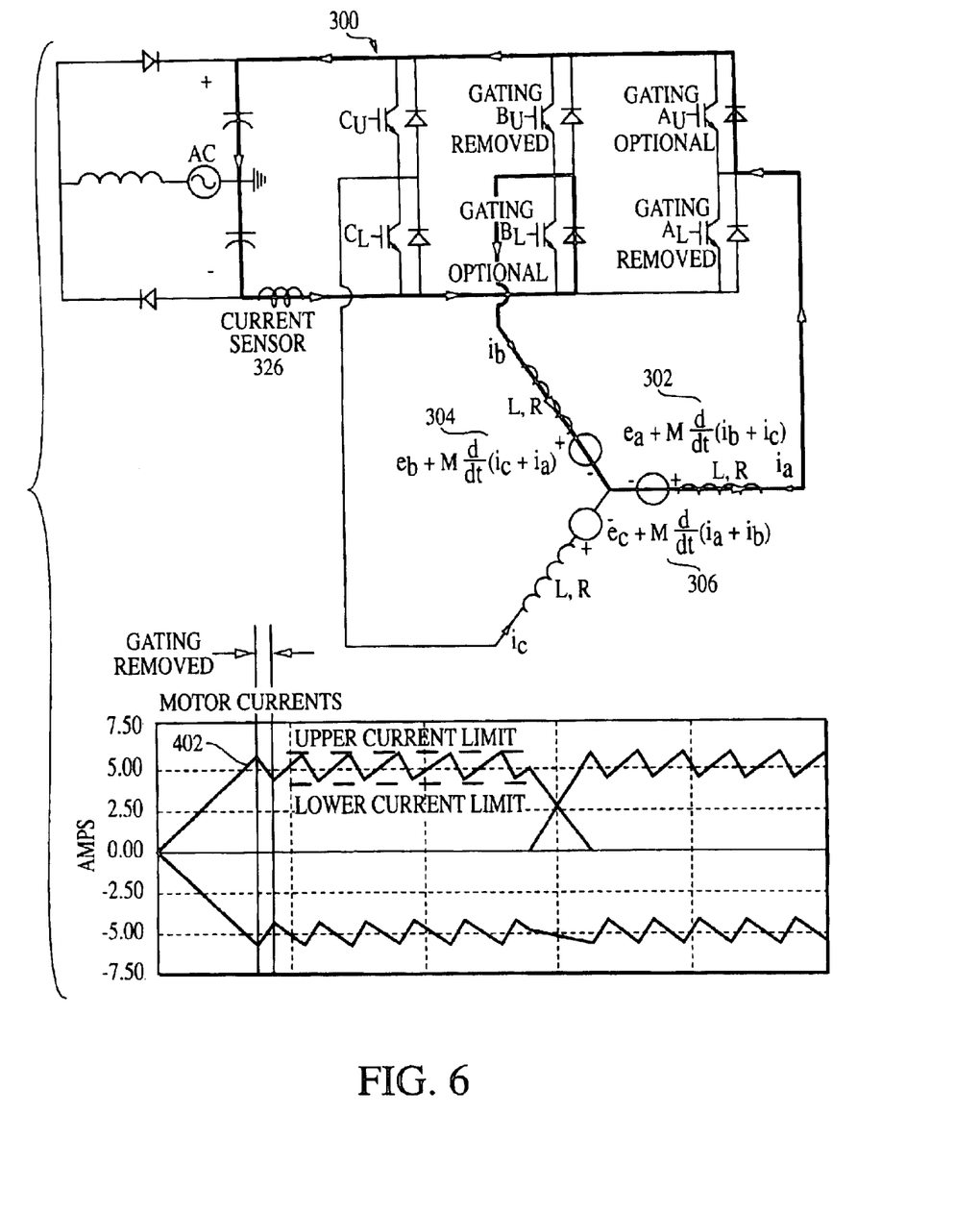
FIG. 6 is a diagram which shows the discharging of two power transistors by reverse voltage chopping, and includes a graph showing current vs. time in the operation of FIG. 6 for current flowing through power transistors $B_L$ and $A_U$.

With reference to FIG. 3, the three (3) phases of the ECM, phases A–C, are shown generally as reference numerals 302, 304, 306, respectively. Each ECM motor phase is provided with a connection to a corresponding bus of the three-phase ECM inverter power electronic circuit 300. The ECM inverter power electronic circuit 300 is provided with six power transistors 308, 310, 312, 314, 316, 318, two for each of phases A, B, C. At the left of the ECM inverter circuit of FIG. 3, 60 Hz AC power 319 is rectified by diodes 320 to DC at the bus capacitors 322. The conduction action of the 6 power transistors converts DC at the bus to AC excitation for the ECM, for a wide range of frequencies. The power transistor actions are synchronized to the rotor speed, and motor acceleration or deceleration is accomplished by raising or lowering the motor torque. The transistor inputs are labeled A, B, or C corresponding to the motor phase with subscripts U for connection to an upper bus 332 or L for connection to lower bus 334. A flyback diode 324 is placed in parallel with each transistor to conduct in a direction opposite to that of the transistor, such that an induced motor current is directed through the flyback diode as illustrated in FIG. 6a.

Gating reference signals $A_U, A_L, B_U, B_L, C_U, C_L$ from the microprocessor 328 are amplified by gate driver circuits 336 and allow motor current conduction to two of the three ECM motor phases at any one time. That is, at any given time depending on the particular gating command provided by microprocessor 328, two of the six power transistors will be switched to an "on" charge state to drive the corresponding ECM motor phases.

Figure 5:
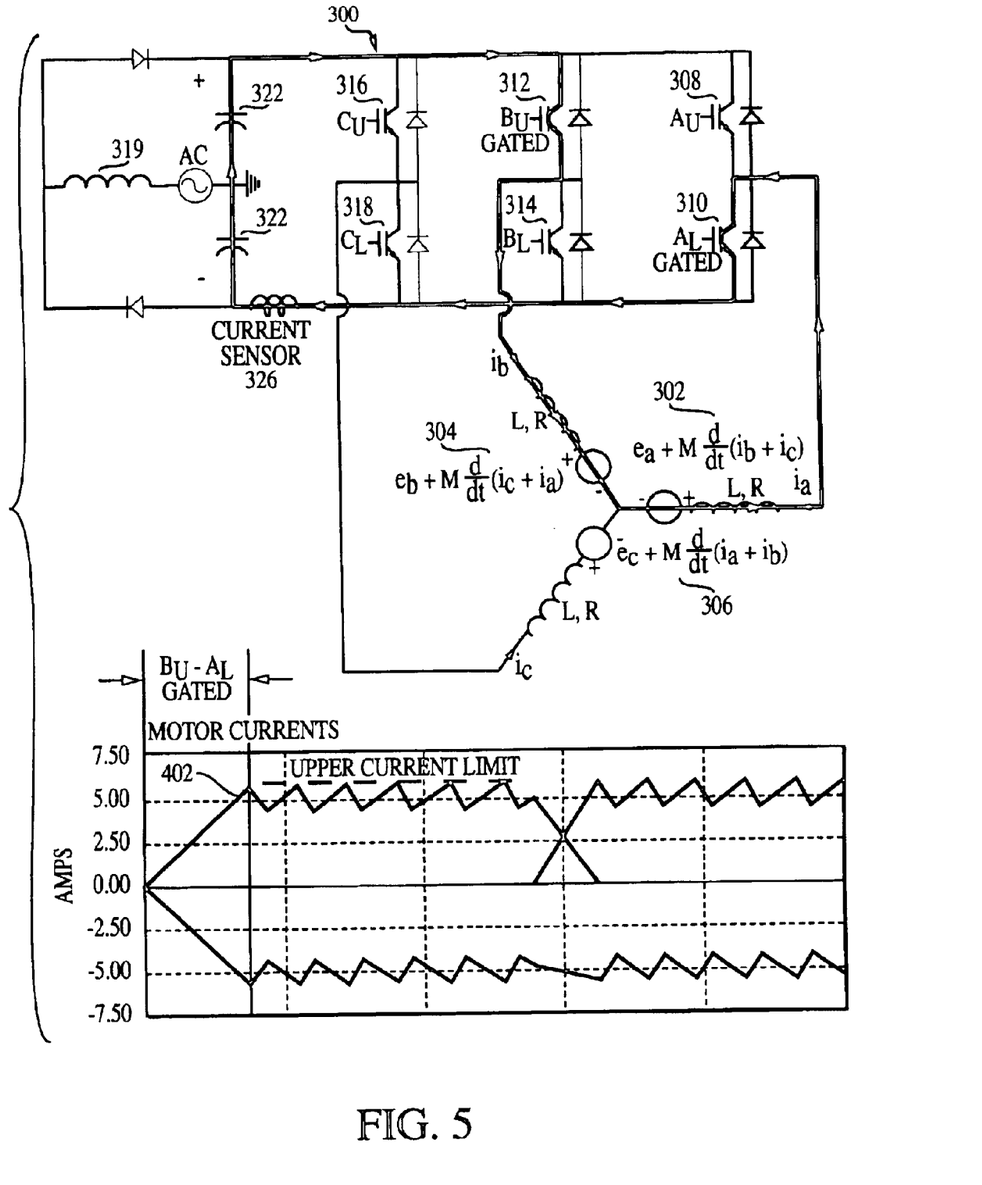
FIG. 5 is a diagram which shows the charging of two power transistors to drive two phases of the ECM, and includes a graph showing current vs. time for current flowing through power transistors $B_U$ and $A_L$ in the operation of FIG. 5.

For example, with reference to FIG. 5, when the microprocessor 328 provides gating reference signals $B_U$-$A_L$, B-phase upper bus power transistor 312 and A-phase lower bus power transistor 310 are switched "on" to drive ECM motor phase B 304 and ECM motor phase A 302. The direction of the motor current travels from ECM motor phase B 304 through ECM motor phase A 302 to produce the torque necessary to produce the desired rotation.

Following this example, the initial excitation of the ECM is illustrated in the waveform of FIG. 5. Both the B-phase upper bus power transistor 312 and the A-phase lower bus power transistor 310 are active, as determined by processing the signals from the three Hall sensors such that these power transistors are "gated" to allow conduction. As indicated in FIG. 5, the motor current ramps upward from 0 to a predetermined upper current limit, following the behavior of an inductive circuit. The actual path of the current is seen by following the path illustrated in FIG. 5 illustrated by the bold directional line traced along the ECM inverter power electronic circuit 300. The direction of the current flow is shown for the ECM driven by the positively charged capacitor bank 322. For reference purposes, when the ECM is driven in this manner, the direction of rotation of the ECM rotor 116 is in a positive or forward direction.

In order to stay within predetermined current limits, the current flowing through the ECM inverter power electronic circuit 300 is measured by a current sensor 326. When the measured current remains below the motor current command 402, the original gating designations are retained and the motor current flows through the appropriate power transistors. On the other hand, when the current measured by current sensor 326 exceeds the motor command current 402, and then the gating designations are modified. Staying with the example used in FIG. 5, the original gating designations, as determined by processing the signals from the Hall sensors, are B-phase upper bus power transistor 312 and A-phase lower bus power transistor 310. As described above for FIG. 5, this produces a charging action which drives the direction of the rotation of the ECM rotor 116 in a positive or forward direction.

When the current measured by current sensor 326 exceeds a predetermined upper level, usually the same as the motor current command 402, the current flowing through the ECM inverter power electronics circuit 300 must be reduced. This is accomplished by the microprocessor 328 by altering the power transistor gating designations to the B-phase lower bus power transistor 314 and the A-phase upper bus, power transistor 308, as illustrated in FIG. 6 (indicated as "gating optional"). This action causes the measured current in the ECM inverter power electronic circuit 300 to be reduced in value below the predetermined upper current limit. When the current measured by current sensor 326 reaches a predetermined lower current limit, usually a small increment lower than the motor current command 402, the original gating designations, as described with respect to FIG. 5, are restored. Accordingly, with reference to the waveform of FIG. 6, the measured current through current sensor 326 alternates between a predetermined upper current limit and a predetermined lower current limit during the rotation of the ECM rotor 1116.

The three Hall sensors A, B, C provide only a simplified and localized determination of the relative position of the ECM rotor 116, adequate only for determining the proper gating of the power transistors 310–318. This simplified determination repeats many times over a typical agitator travel. With this configuration of Hall sensors, it is not possible to know the exact position of the agitator 110 in order for the ECM to produce the desired agitator cycle. Instead, by processing the signals from the logic network 200, which are themselves obtained from the signals from the three Hall sensors A, B, C, the relative position of the agitator 110, along with its rotational velocity and direction, can be easily determined.

Figure 8:
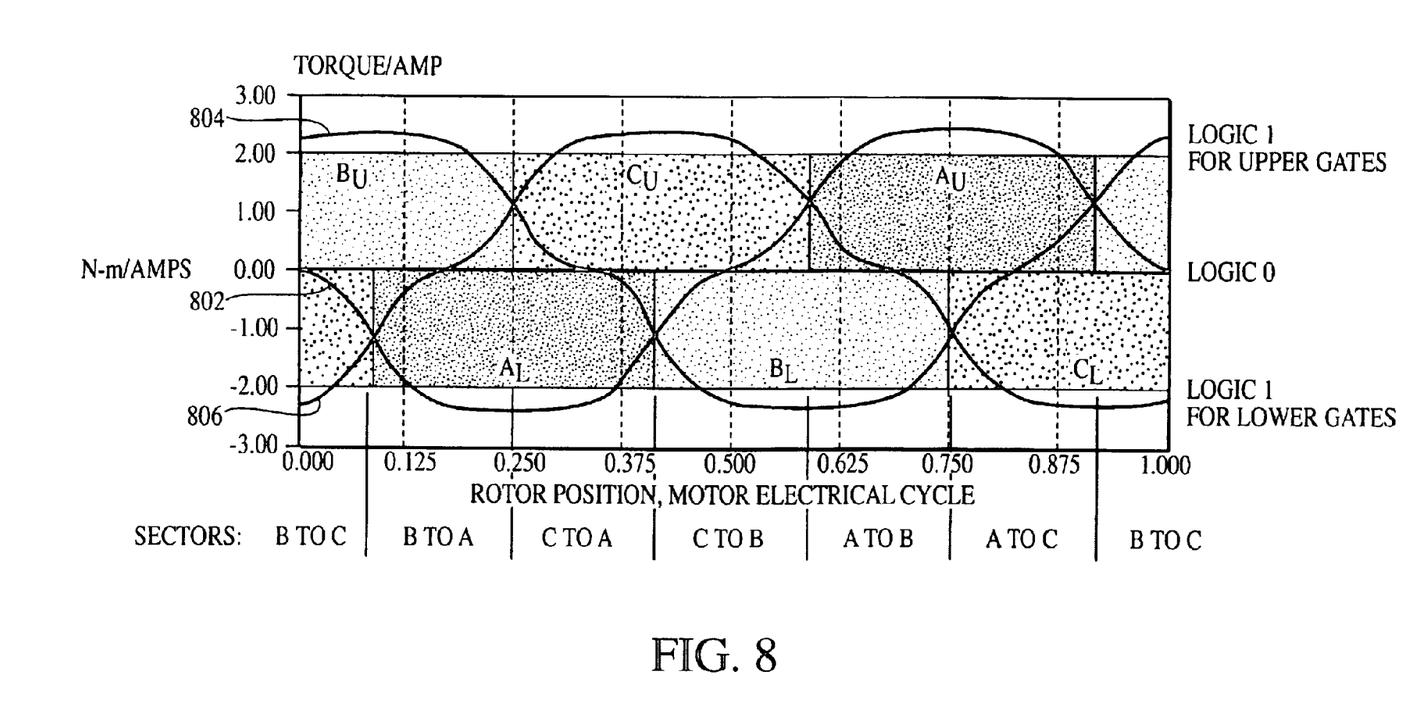
FIG. 8 illustrates the relationship of the Hall probe gating reference signals to ECM motor torque/amp waveforms to produce positive torque.

The position, direction and speed of the agitator 110 can be determined by the microprocessor 328 by processing the inverter gate reference signals $A_U$, $A_L$, $B_U$, $B_L$, $C_U$, $C_L$ from the position sensor logic network 200. Simple AND processing of the six (6) inverter gate reference signals provides sector position information for the microprocessor 328 at a resolution of six (6) sectors per electrical cycle of the motor. Referring to FIG. 8, the six sectors are indicated by these combinations of inverter gate reference signals: 1) Sector $B_U$ to $C_L$, signals $B_U$ and $C_L$ at logic 1, 2) Sector $B_U$ to $A_L$, signals $B_U$ and $A_L$ at logic 1, 3) Sector $C_U$ to $A_L$, signals $C_U$ and $A_L$ at logic 1, 4) Sector $C_U$ to $B_L$, signals $C_U$ and $B_L$ at logic 1, 5) Sector $A_U$ to $B_L$, signals $A_U$ and $B_L$ at logic 1, 6) Sector $A_U$ to $C_L$, signals $A_U$ and $C_L$ at logic 1.

Figure 4:
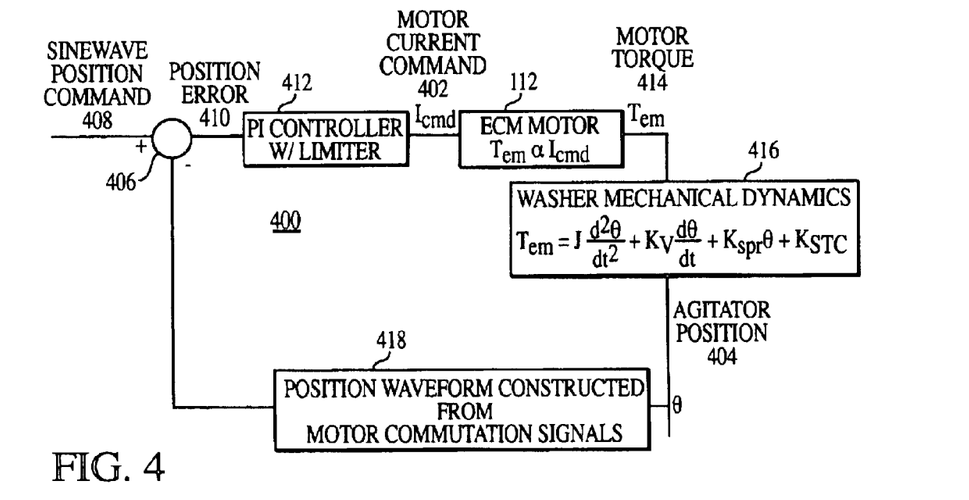
FIG. 4 is a block diagram of an exemplary feedback control loop for the ECM control system.

Referring to FIG. 4, the constructed agitator position signal 418 is constructed from the six inverter gate reference signals by recognizing if the ECM rotor 116 is rotating in a forward or reverse direction. In particular, for any one of the six sectors, the ECM rotor 116 is capable of only moving into one of two adjacent sectors. When the rotor 116 moves into one adjacent sector, for example from sector $B_U$-$A_L$ to sector $C_U$-$A_L$, the microprocessor 328 determines that the rotor 116 is rotating in a forward direction. On the other hand, when the rotor 116 moves into the other adjacent sector, foe example from sector $B_U$-$A_L$ to sector $B_U$-$C_L$, the microprocessor 328 determines that the ECM rotor 116 is rotating in a reverse direction.

Figure 7:
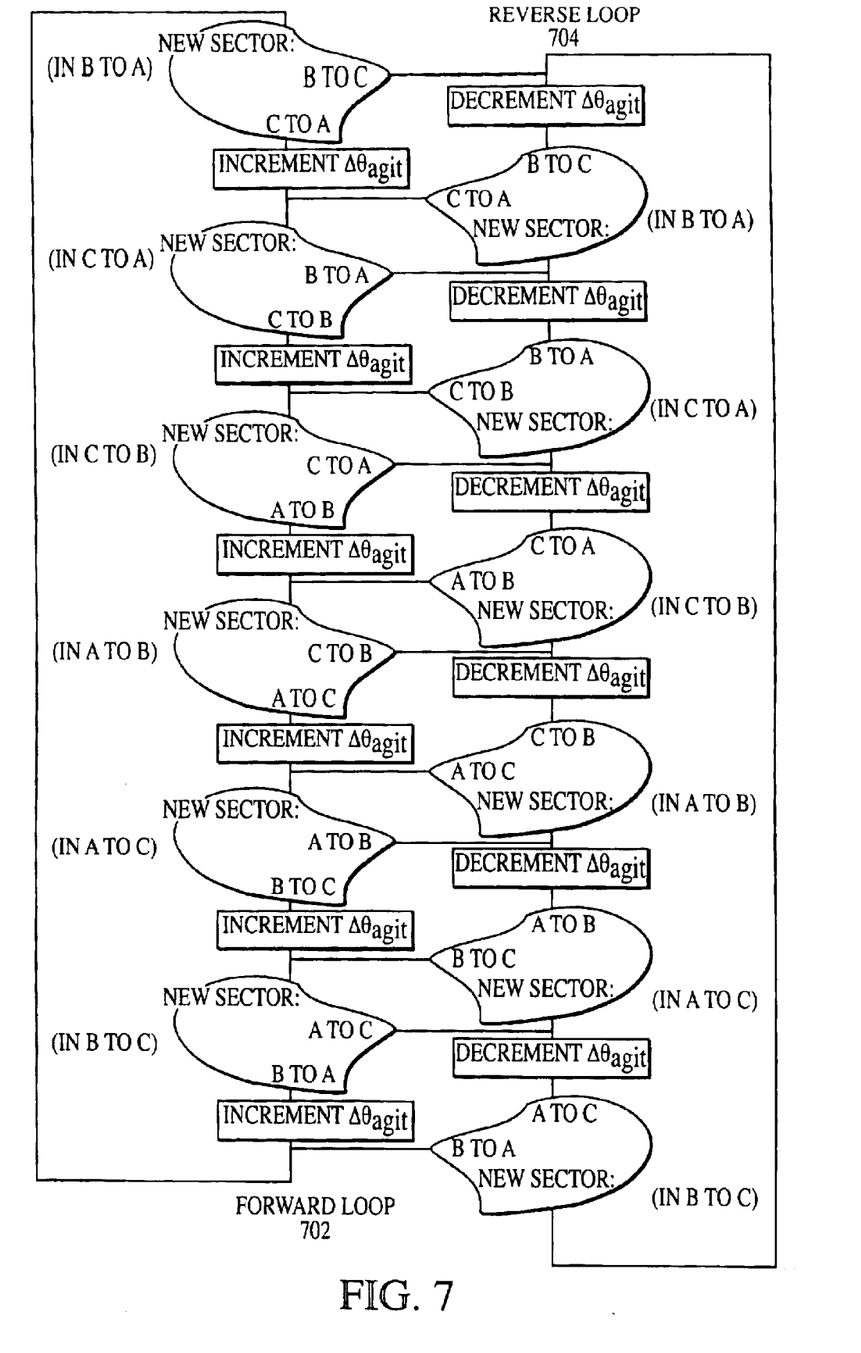
FIG. 7 is a block diagram showing the construction of the agitator position measurement from sector signals.

With reference to the forward loop 702 of FIG. 7, when the rotor 116 is rotating in a forward direction, the constructed agitator position signal 418 is incremented by one (1) agitator position increment for each sector change. The value of the agitator position increment is 60 degrees divided by the pulley ratio and the number of pole-pairs of the motor.

$$\Delta\theta_{agit} = \frac{60}{\rho N_{pp}} \deg$$

Figure 9:
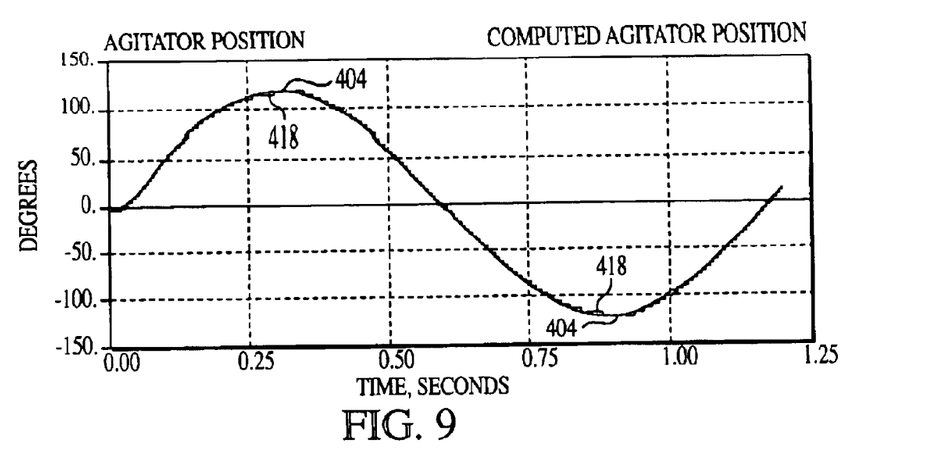
FIG. 9 is a graph showing a comparison between the actual position of the agitator and the computed agitator position.

Likewise, when the ECM rotor 116 is rotating in a reverse direction, the constructed agitator position signal 418 is decremented by one (1) agitator position increment for each sector change as shown in the reverse loop 704 of FIG. 7. When the ECM rotor 116 reverses direction, for example from a forward rotation to a reverse rotation, the constructed agitator position signal 418 is left unchanged. This situation is indicated by the perpendicular directional lines which cross between the forward loop 702 and the reverse loop 704 of FIG. 7. FIG. 9 compares an actual agitator position 404 to a constructed agitator position signal 418. The "stair-step" characteristic of the constructed agitator position signal 418 is a result of the manner that discrete values of agitator position increment are added and subtracted.

The microprocessor 328 implements the proportional-integral feedback control loop of FIG. 4. At the summation point 406, the constructed agitator position 418, constructed from the position sensor logic network 200 by the flow diagram of FIG. 7, is compared to the sine wave position command signal 408 provided by the agitator cycle data file contained in the look-up table stored in a ROM 330.

A position error 410 results from comparing the constructed agitator position 418 with the sine wave position command 408. Based on the magnitude and duration of the position error 410, a proportional-integral controller with current limiter 412 produces a value of the motor current command signal 402. The motor current command signal 402 is compared to the measured current from inverter current measurement 326 to modify the inverter gate reference signals $A_U$, $A_L$, $B_U$, $B_L$, $C_U$, $C_L$ to the actual gating signals supplied to the ECM inverter power electronic circuit 300.

With reference to FIG. 4, when the ECM 102 is operated in a low-speed, current-regulated mode, the torque produced is approximately linearly proportional to its current command. This characteristic makes the ECM well suited for employment in a classical feedback control system for driving the agitator 108. The various agitator operational modes of the agitator are controlled by the position feedback control system shown in FIG. 4. In particular, a digitally created, substantially sinewave position command 408 is compared to the constructed agitator position 418, and the error between the two is acted upon by the closed loop ECM control system 400. The output of the closed loop ECM control system 400 is the motor current command 402 to the ECM. By driving the ECM with the motor current command 402, the ECM produces a rotational motor torque 414, which when considering the washer mechanical dynamics 416, results in an agitator position 404. In addition, the proportional-integral controller 412 includes a current limiter which prevents excessive current from being commanded to the ECM inverter power electronic circuit 300. To reduce the overall number of components and to reduce the cost of components, the agitator position measurement is digitally constructed from the ECM 200 commutation signals provided by the three Hall sensors A, B. C.

Referring to FIG. 8, the Hall probe gating reference signals (depicted as blocks $B_U$, $C_U$, $A_U$, $A_L$, $B_L$ and $C_L$) are shown superimposed on the ECM torque/amp waveforms 802, 804, 806 for each of the three motor phases. For example, the torque/amp waveform 804 for the B-phase of the ECM is shown starting at the top left of the graph, and ending at the top right. Similarly, for the A-phase of the ECM, the torque/amp waveform 802 is shown starting at the "0" point at the left of the graph, and ending at the "0" point at the right. Finally, the torque/amp waveform 806 for the C-phase of the ECM is shown starting at the bottom left of the graph, and ending at the bottom right.

By superimposing the ECM torque/amp waveforms on the Hall sensor gating reference signals, it is shown that the selection of any particular gating signal is based on creating the highest amount of torque over the rotor travel. A particular gating reference signal indicates which transistor of the inverter power electronic circuit 300 is intended to be conducting current. The conduction of upper transistors 316, 312 and 308 is intended to obtain positive motor current in motor phases 306, 304, and 302 respectively, while the conduction of lower transistors 318, 314, and 310 is intended to obtain negative motor current in motor phases 306, 304, and 302 respectively. A gating reference signal endures for only 120 electrical degrees, and it is aligned with largest portion of the torque-amp waveform so that the greatest possible torque may be produced. The upper gating reference signals are aligned with maximum positive portions of the torque/amp waveforms. The lower gating reference signals are aligned with maximum negative portions of the torque/amp waveforms, with the intention of obtaining negative motor current during negative torque/amp, multiplying to produce positive torque. Transitions on the upper transistor gating reference signals alternate with transitions on the lower transistor gating reference signals, in a manner that a transition of some type occurs every 60 electrical degrees. These are the conventions for obtaining positive torque and forward direction. To obtain negative torque and reverse direction, the convention is interchanged, aligning the upper gating reference signals with negative portions of the torque/amp waveforms and the lower gating reference signals with positive portions of the torque/amp waveforms.

FIG. 8 describes the general motor phase directions to produce positive torque. The actual gating commands are modified to implement current regulation and torque direction.

When the washing machine is set to an agitation mode with a full wash load, the actual agitator position 404 will track the commanded agitator position 408 in a satisfactory manner, and both the ECM speed and torque possess a sinusoidal characteristic. It is necessary for there to be a difference in the commanded agitator position and the actual agitator position to obtain a current command to the motor.

A unique aspect of the feedback control system of the present invention is that it automatically compensates for variations in the wash load. For example, for a light wash load, the actual agitator position will track the command agitator position more closely with smaller error. The smaller error causes less current to be commanded to the motor, producing lesser torque for a smaller load. The behavior is obtained from the feedback control system provided by the ECM control unit 130.

When the washing machine is provided with an extremely heavy wash load, the motor current command 402 may reach its limit. As noted above, with respect to FIG. 4 the feedback control system of the ECM washer agitator control system is provided with a current limiter 412. Accordingly, when an extremely heavy wash load is encountered, the motor current command 402 supplied to the ECM is limited to a predetermined upper limit for safety purposes to prevent dangerously large currents from being provided to the ECM through the ECM inverter power electronic circuit 300.

The discrete "stair-step" nature of the constructed agitator position signal 418 causes a saw-tooth output from the proportional-integral controller with limiter 412 which produces a similar current signal supplied to the ECM. This increases torque pulsation, which may in turn exacerbate acoustic noise. Thus, it is desirable to extrapolate the computed position in between updates from the sector transitions. As such, the ECM control unit 130 can employ a position extrapolation technique. At the moment of a sector transition, the latest velocity can be computed from the timing between the latest and previous sector transitions as follows:

$$v_{latest} = \frac{\Delta \theta_{agit}}{T_{latest} - T_{prev}}$$

A shift register can be used to store the previous velocity computation, allowing an acceleration to be computed as follows:

$$a = \frac{v_{latest} - v_{prev}}{T_{latest} - T_{prev}}$$

The extrapolated position is then determined by the following equation:

$$\theta = \theta_{latest} + v_{latest}(t - T_{latest}) + \frac{a}{2}(t - T_{latest})2$$

At the moment that a sector transition is detected, the computed position is updated according to the original technique, the velocity is shifted, and a new velocity and acceleration are computed. When a reversal of direction of the ECM is detected, the velocity is set to the negative of the previous value as follows:

$$v_{latest} = -v_{prev}$$

With the use of this position extrapolation commutation technique, the saw-tooth behavior of the proportional-integral controller with limiter 412 is reduced, which helps to reduce torque pulsation.

Figure 10:
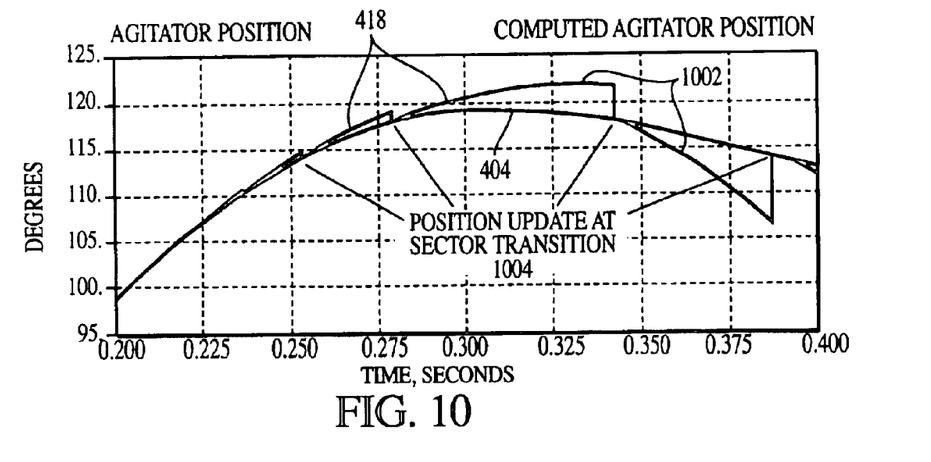
FIG. 10 is a graph showing position extrapolation accuracy at low speed.

The accuracy of the position extrapolation suffers when the rotational velocity of the ECM is low and the acceleration is large. With reference to FIG. 10, the agitator 110 is slowing towards the end of its arc. The parabolic curves 1002 are the extrapolation results, and at each sector transition 1004, the constructed agitator position 418 is updated to agree with the actual position 902. As the end of the agitator stroke is approached, the extrapolations 1002 become more divergent from the actual position. The proportional-integral controller with limiter 412 is acting upon the constructed agitator position, and the large error can produce erratic operation from the proportional-integral controller with limiter 412.

Figure 11:
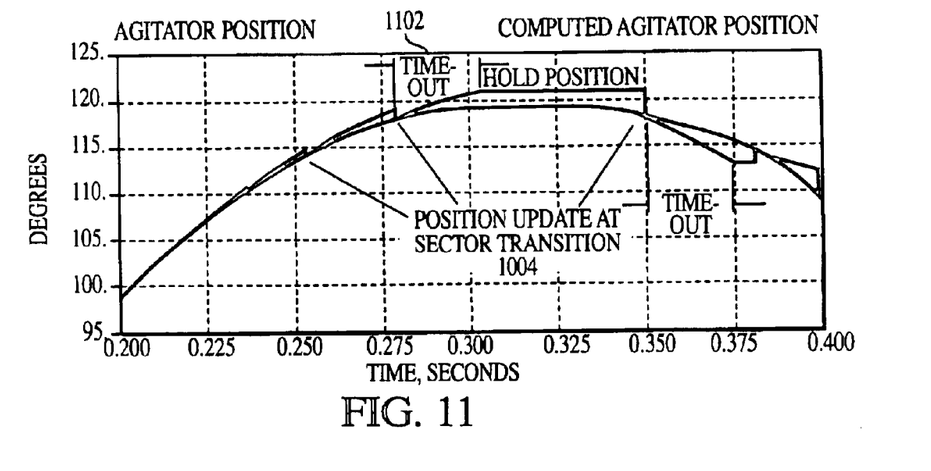
FIG. 11 is a graph showing the result of adding a "time-out" function to position extrapolation at low speed.

To correct this situation, a time-out 1102 is employed with the position extrapolation technique (FIG. 11). When the time since the last sector transition 1004 exceeds the time-out 1102 value, the constructed agitator position 418 is held until the next update at the sector transition.

The exemplary embodiment of the invention thus provides several advantages over prior art washing machines. For example, by employing three adjacent Hall sensors A, B, C to determine the position of the agitator 110 for input to the feedback control loop of the ECM control unit 130, the ECM control unit outputs a current command to the ECM which enables the ECM to drive the agitator such that its actual motion closely approximates the command motion of the agitator based on the user's selection of a unique agitator cycle. Accordingly, a plurality of desirable agitator cycles is available from the washing machine through the employment of an ECM which is controlled by a simplified control system using three adjacent Hall sensors. Thus, a reduction in the cost of the ECM control system is achieved while increasing the overall performance of the washing machine during various user selectable agitation cycles.

While the invention has been described with reference to an exemplary embodiment, it is understood by those skilled in the art that various changes and modifications may be made without departing from the scope of the invention. Further, it is intended that the invention not be limited to the particular embodiment disclosed, but that the invention will include all embodiments fallen within in the scope of the appended claims.

What is claimed is:

1. A method for controlling an electronically commutated motor (ECM) for selectively driving an agitator of a clothes washing machine, comprising the steps of:

sensing a repetitively localized position of a rotor of the ECM from the outputs of a plurality of Hall sensors positioned to interact with a magnetic field produced by the rotor;

determining an agitator position and an agitator direction of rotation from the sensed repetitively localized position of the rotor;

calculating an agitator position error from a comparison of an agitator position command and the agitator position;

calculating an ECM command current from the agitator position error;

selectively gating power transistors, based upon the repetitively localized rotor position, to energize selected motor phases of the ECM connected to the selectively gated power transistors;

measuring current flowing through the selectively gated power transistors to the ECM;

gating and un-gating the selectively gated power transistors dependent upon whether the measured current is greater than or less than upper and lower current limits related to the ECM command current.

2. The method of claim 1, wherein the ECM comprises a three-phase ECM, and the selected motor phases comprise two selected motor phases, and selectively gating two power transistors to drive the two selected motor phases.

3. The method of claim 2, including connecting each motor phase to a corresponding phase bus of a three-phase inverter power electronic circuit which includes six power transistors, two for each motor phase.

4. The method of claim 3, including measuring current flowing through the inverter power electronic circuit with a current sensor, and when the measured current remains below the upper current limit, retaining an original gating designation of two selectively gated transistors, and when the current measured by the current sensor exceeds the upper current limit, selecting a new gating designation of two new selectively gated power transistors, and when the current measured by the current sensor reaches the lower current limit, restoring the original gating destination, such that the current through the inverter power electronic circuit alternates between the upper current limit and the lower current during rotation of the rotor.

5. The method of claim 2, including alternately gating and un-gating two power transistors dependent upon whether the measured current is less than or greater than the upper and lower current limits.

6. The method of claim 2, including positioning a Hall sensor unit, comprising three adjacent Hall sensors, adjacent to the rotor.

7. The method of claim 2, wherein a programmed digital processor controls the ECM, the Hall sensors provide sector position information to the digital processor which performs logic processing to provide gating command signals for the power transistors while also considering current regulation commands and torque direction commands.

8. The method of claim 7, wherein the digital processor AND processes inverter gate reference signals logically derived from the plurality of Hall sensors to provide sector position information on the ECM.

9. The method of claim 7, including storing data for a particular agitator cycle in a data file on rotational position of the agitator as a function of time as a look-up table in a read only memory (ROM) accessed by the digital processor.

10. The method of claim 9, wherein the digital processor implements a proportional-integral feedback loop wherein a constructed agitator position is compared to a position command signal provided by an agitator cycle data file in a look-up table stored in the ROM to generate a position error, and based upon the magnitude and duration of the position error, a proportional-integral controller produces the ECM command current.

11. The method of claim 10, wherein the proportional-integral controller includes a current limiter which prevents the ECM command current from being excessive.

12. The method of claim 7, wherein when the rotor rotates in a forward direction, the digital processor increments a constructed agitator position signal by one agitator position increment for each sector change, and when the rotor rotates in a reverse direction, the digital processor decrements the constructed agitator position by one agitator position increment for each sector change, and when the motor reverse direction, the constructed agitator position signal is left unchanged.

13. The method of claim 7, wherein at each motor sector transition, the digital processor updates a computed agitator position to agree with the determined agitator position, and the digital processor extrapolates the computed agitator position in between updates from motor sector transitions.

14. The method of claim 13, wherein when the time since the last motor sector transition exceeds a time-out value, the computed agitator position is maintained until a next update at a next motor sector transition.

15. A clothes washing machine comprising:

an electronically commutated motor (ECM) having a rotor for selectively driving an agitator, a plurality of Hall sensors positioned to interact with a magnetic field produced by the rotor for sensing a repetitively localized position of the rotor, a plurality of power transistors connected to different motor phases of the ECM;

a current sensor for measuring current flowing through selectively gated power transistors to the ECM; and an ECM control for, determining an agitator position and an agitator direction of rotation from the repetitively localized position of the rotor sensed by the plurality of Hall sensors, calculating an agitator position error from a comparison of an agitator position command and the agitator position, calculating an ECM command current from the agitator position error, selectively gating the power transistors, based upon the repetitively localized rotor position, to energize selected motor phases of the ECM connected to the selectively gated power transistors, and gating and un-gating the selectively gated power transistors dependent upon whether the measured current is greater than or less that upper and lower current limits related to the ECM command current.

16. The washing machine of claim 15, wherein the ECM comprises a three-phase ECM, and the selected motor phases comprise two selected motor phases, and two power transistors are selectively gated to drive the two selected motor phases.

17. The washing machine of claim 16, including a three-phase inverter power electronic circuit which includes six power transistors, two for each motor phase for connecting each motor phase to a corresponding phase bus.

18. The washing machine of claim 17, the ECM control, when the measured current by the current sensor remains below the upper current limit, retaining an original gating designation of two selectively gated transistors, and when the current measured by the current sensor exceeds the upper current limit, selecting a new gating designation of two new selectively gated power transistors, and when the current measured by the current sensor reaches the lower current limit, restoring the original gating destination, such that the current through the inverter power electronic circuit alternates between the upper current limit and the lower current during rotation of the rotor.

19. The washing machine of claim 16, the ECM control alternately gating and un-gating two power transistors dependent upon whether the measured current is less than or greater than the upper and lower current limits.

20. The washing machine of claim 16, including a Hall sensor unit, comprising three adjacent Hall sensors, positioned adjacent to the rotor.

21. A clothes washing machine comprising:

an electronically commutated motor (ECM) having a rotor for selectively driving an agitator;

a plurality of Hall sensors positioned to interact with a magnetic field produced by the rotor for sensing a repetitively localized position of the rotor;

a plurality of power transistors connected to different motor phases of the ECM;

a current sensor for measuring current flowing through selectively gated power transistors to the ECM; and an ECM control for, determining an agitator position and an agitator direction of rotation from the repetitively localized position of the rotor sensed by the plurality of Hall sensors, calculating an agitator position error from a comparison of an agitator position command and the agitator position, calculating an ECM command current from the agitator position error, selectively gating the power transistors, based upon the repetitively localized rotor position, to energize selected motor phases of the ECM connected to the selectively gated power transistors, gating and un-gating the selectively gated power transistors dependent upon whether the measured current is greater than or less that upper and lower current limits related to the ECM command current, wherein the Hall sensors provide sector position information to the digital processor which performs logic processing to provide gating command signals for the power transistors while also considering current regulation commands and torque direction commands.

22. The washing machine of claim 21, wherein the digital processor AND processes inverter gate reference signals logically derived from the plurality of Hall sensors to provide sector position information on the ECM.

23. The washing machine of claim 21, including a read only memory (ROM) for storing data for a particular agitator cycle in a data file on rotational position of the agitator as a function of time as a look-up table accessed by the digital processor.

24. The washing machine of claim 23, wherein the digital processor implements a proportional-integral feedback loop having a proportional-integral controller, wherein a constructed agitator position is compared to a position command signal provided by an agitator cycle data file in a look-up table stored in the ROM to generate a position error, and based upon the magnitude and duration of the position error, the proportional-integral controller produces the ECM command current.

25. The washing machine of claim 24, wherein the proportional-integral controller includes a current limiter which prevents the ECM command current from being excessive.

26. The washing machine of claim 21, wherein when the rotor rotates in a forward direction, the digital processor increments a constructed agitator position signal by one agitator position increment for each sector change, and when the rotor rotates in a reverse direction, the digital processor decrements the constructed agitator position by one agitator position increment for each sector change, and when the motor reverse direction, the constructed agitator position signal is left unchanged.

27. The washing machine of claim 21, wherein at each motor sector transition, the digital processor updates a computed agitator position to agree with the determined agitator position, and the digital processor extrapolates the computed agitator position in between updates from motor sector transitions.

28. The washing machine of claim 27, wherein when the time since the last motor sector transition exceeds a time-out value, the computed agitator position is maintained until a next update at a next motor sector transition.

* * * * *